Figure 1:
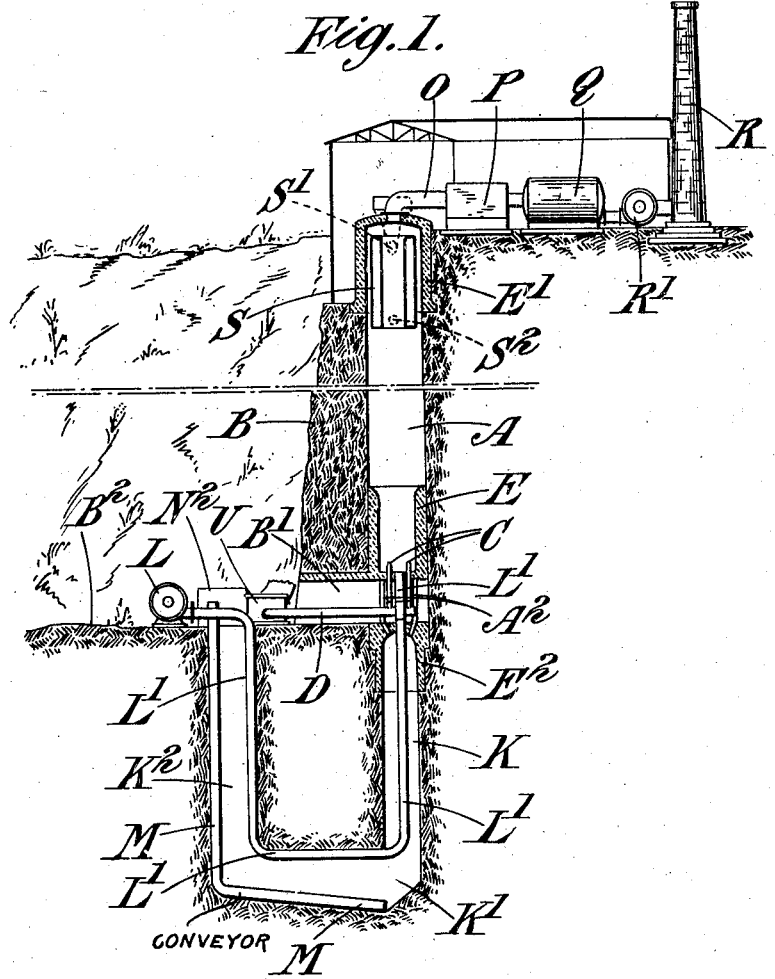

Feb. 3, 1931.  E. P. C. GIROUARD  1,791,165
APPARATUS FOR HEAT TREATMENT OF CALCAREOUS AND LIKE MATERIALS
Filed July 28, 1926  2 Sheets-Sheet 1

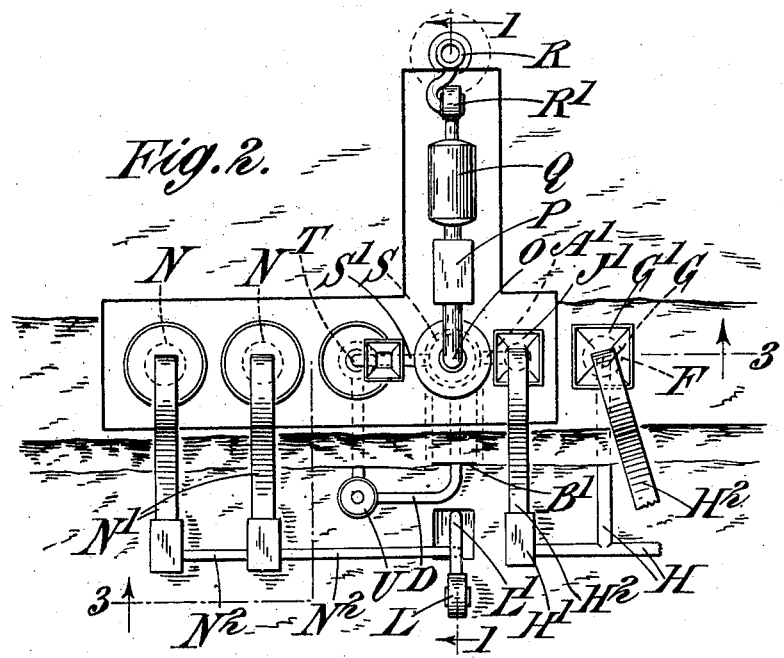
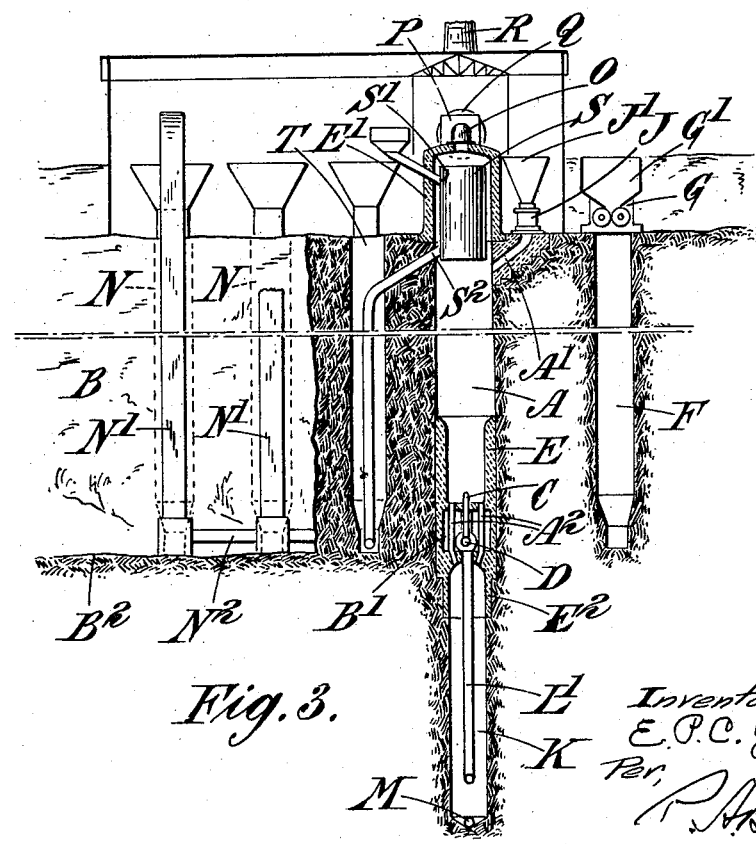

Patented Feb. 3, 1931

1,791,165

UNITED STATES PATENT OFFICE

EDOUARD PERCY CRANWILL GIROUARD, OF SNODLAND, ENGLAND

APPARATUS FOR HEAT TREATMENT OF CALCAREOUS AND LIKE MATERIALS

Application filed July 28, 1926, Serial No. 125,399, and in Great Britain August 7, 1925.

This invention relates to the calcining, sintering and roasting of calcareous, argillaceous and like raw materials such as are used for making cement and lime by the method which consists in the raw materials in powdered form being permitted to fall freely down a substantially vertical shaft against an ascending column of hot gases.

The object of the invention is to effect improvements in the installation and so to utilize the waste gases that fuel will be economized and a finished product of superior quality will be obtained.

To secure a proper intermingling and calcination of the powdered raw materials before they reach the clinkering or hottest zone at the lower end of the shaft, it is necessary for the particles to fall through a considerable distance and the execessive cost of building a tower of this height and the losses of heat through external radiation from its walls, have prevented previous proposals from being carried into practical effect.

According to this invention these drawbacks are obviated by sinking a shaft in the clay, chalk, rock or other natural bed according to the locality—and when the shaft is sunk in clay, instead of being lined with firebrick, the whole or parts of it may be burnt out so that the baked wall of the shaft itself forms a refractory lining. By so sinking the shaft not only is the cost of its construction very greatly reduced but in addition external heat radiation losses are practically eliminated thus further improving the efficiency of the kiln.

As a general rule raw materials of the kind suitable for treatment in accordance with this invention are obtained by quarrying and it is therefore convenient to sink the shaft in the face of a quarry so that the burners are approximately level with the floor of the quarry. Below the burners a further shaft or chamber is preferably formed into which the clinker is discharged and through which is passed the air to support combustion. In this way the otherwise waste heat of the incandescent clinker is fully utilized to heat the incoming air to a very high temperature and the clinker is efficiently cooled before being raised to the surface in any convenient manner. Alternatively the hot clinker may be cooled in any known manner for example in a rotary or other form of cooling apparatus, but in all cases the air to support combustion should be pre-heated to the greatest possible extent.

According to this invention the waste heat of the ascending gases is preferably used to effect the low temperature carbonization of coal in a retort formed by or mounted in the upper part of the kiln shaft. The hot gases either pass over the retort without actually coming in contact with the coal it contains or these gases may encounter a descending shower of powdered coal and thus become intermixed with the coal gases which are given off. In either case, in addition to the ordinary by-products of low temperature carbonization, fuel of high quality is obtained and this is preferably used to supply the burners of the kiln. Prior to being introduced into the shaft the raw material is dried —preferably in a silo or shaft sunk in the ground—and the raw coal may be similarly stored, either or both substances being dried if desired by waste heat from the kiln or by heat derived from cooling the clinker or the carbonized coal.

One form of installation for manufacturing cement or lime according to this invention is diagrammatically illustrated by way of example in the accompanying drawings, in which Figure 1 is a vertical section of a quarry, showing the kiln shaft, on the line 1—1 of Figure 2, Figure 2 is a plan, and Figure 3 is a vertical section on the line 3—3 of Figure 2.

In the installation shown a vertical kiln shaft A is sunk with its longitudinal axis approximately parallel to the face B of a quarry, the base of the shaft proper being on the ground level $B^2$ of the quarry. A working adit $B^1$ communicates with the base of the shaft and thus gives access to the burners C to which pulverized fuel is supplied through one or more pipes D as hereafter more fully described.

The shaft is sunk in the natural bed of clay, chalk, limestone or the like B. The upper part of the shaft constitutes a preheating zone for the material to be treated and the lower end of the shaft which constitutes the sintering zone may have a lining E of some highly refractory material such as firebrick. The clinkering zone is reduced in diameter relatively to the main portion of the shaft, the relative dimensions being designed in accordance with the nature of the raw materials and fuel so as to produce the desired result. The top $E^1$ or the upper end of the shaft may also have a firebrick lining or may be built up of some such suitable brickwork.

The raw materials are preferably stored prior to use in one or more drying chambers or shafts F conveniently sunk in the ground and grouped around or in line with the kiln shaft A. These raw materials are crushed before being stored—as for example by means of a known form of crushing apparatus indicated at G—into which they are fed by means of a hopper $G^1$. After being so dried the raw materials are transferred by conveyers H and elevators $H^1$ and further conveyers $H^2$ to a hopper or bin $J^1$ of a pulverizing apparatus J. This apparatus communicates through one or more lateral passages $A^1$ with the upper end of the kiln shaft A into which the materials are thus introduced in the form of a dense cloud of dry pulverized particles.

Around or between the burner nozzles C are by-pass passages $A^2$ through which the hot clinker passes into a cooling shaft K sunk in the ground below the kiln shaft and working adit. The upper end of this cooling shaft is lined with firebrick $E^2$ and the lower end communicates by means of a gallery $K^1$ with an elevator shaft $K^2$. The air to support combustion and to provide the upward current of hot gases in the kiln shaft is supplied to the burners by a fan L through a duct $L^1$ which passes through the shaft $K^2$, gallery $K^1$ and hot clinker chamber K. Thus the cold air drawn in by the fan is heated to a high degree and the hot clinker is cooled before being conveyed, as by elevating conveyors M, to the ground level $B^2$. From that point the clinker can be transferred for further treatment, such as by grinding, in any known manner or it may be stored in silos N, sunk in the ground in a manner similar to the raw materials silos F, suitable elevators $N^1$ and conveyors $N^2$ (only partly shown in Figure 1) being provided for this purpose.

At its upper end and above the preheating zone the kiln shaft is furnished with an outlet flue O for the hot waste gases which on leaving the shaft A are passed through an electric or other suitable dust collector P, any heat they may still contain being used in a waste heat boiler, indicated at Q, before escaping through the chimney shaft R, a fan $R^1$ being provided at the foot of the chimney shaft to create an induced draught.

In operation, for the manufacture of cement or lime the raw materials after being crushed, dried and pulverized are introduced into the upper end of the kiln shaft which they descend in the form of a dense cloud of particles against the ascending turbulent stream of hot gases created by the fan L and the burners C. In so descending the shaft, a thorough mixing of the particles takes place and the final clinkered or viscous droplet of cement ensures a clinker of very even composition. The size of these particles can be controlled by varying the speed at which the gases pass through the throat in the lower part of the kiln shaft and by regulating the rate at which the hot air, fuel and raw materials are introduced.

After the hot gases leave the sintering zone of the shaft they are still at a high temperature, and in order that this heat may be fully employed the upper end of the shaft is preferably formed into or provided with a retort in which coal, preferably in powdered form, is subjected to low temperature carbonization.

Such an arrangement is diagrammatically shown in the drawings, Figures 1 and 3 showing an annular retort S—which may have one or more chambers—mounted in the upper end of the kiln shaft, furnished with inlet openings $S^1$ for the raw powdered fuel and with discharge passages $S^2$ for the coke produced therein. The raw coal is preferably dried in storage shafts or silos such as T sunk in the ground in the same manner as the shafts for storage of clinker and raw material and provided with suitable conveyers and elevators. The hot low temperature coke from the retort S is made to give up its heat—as for example by passing the coke discharge passage $S^2$ through or round the coal drying silo T or by enclosing this conduit in any known heat utilizing device. The cooled coke is then pulverized in an apparatus such as that indicated at U and is supplied through the pipe D to the burners, any known form of apparatus being used to force the coke dust from its storage bin or chamber to the point where it is to be burned. Alternatively, instead of using the powdered coke for the burners, this coke may be employed elsewhere and the burners supplied with the oil or gas obtained by subjecting the coal to low temperature carbonization. The by-products from the low temperature carbonization are treated in the known manner by apparatus which in itself forms no part of the present invention.

Although in the drawings the shaft is shown as circular, it may if desired be of substantially rectangular or other non-circular cross section, the sintering zone which has a smaller cross sectional area being of circular or other shape and if desired of taper form. Although I do not desire to be limited to any particular dimensions for the shaft, the height should be such that the material may be properly preheated and sintered, while falling by gravity. As an example the sintering zone may have a cross-sectional area of 70 square feet and a height of 50 feet, while the section of the shaft thereabove for preheating and calcining may be 100 feet high with a cross-sectional area of 500 square feet. An open hearth burning solid fuel with which the calcined particles can become combined is not suitable for producing an ascending stream of hot gases within the shaft but the term "burner" is intended to cover any other means for supplying the necessary hot gases.

By the term "material in powdered form" I do not desire to be restricted to any particular fineness of the powder as this may vary with the kind of material used and may in some cases be coarse powder, such as granules.

Thus with an installation according to this invention heat losses both from internal and external radiation are largely prevented, full use is made of the hot gases, after they have calcined or sintered the raw materials in the lower end of the shaft, to effect the low temperature carbonization of fuel subsequently used for the hearth or burners, the heat from the incandescent clinker and coke is fully employed and any further heat in the gases after they have passed through or over the retort is utilized in some known form of waste heat boiler or the like.

What I claim as my invention and desire to secure by Letters Patent is:—

1. A kiln for the preheating and clinkering of raw materials in powdered form comprising a shaft extending below the ground level and completely encircled by the ground, whereby heat radiation from the shaft is retarded, said shaft having means for introducing powdered raw material at the upper end of the shaft whereby it may descend by gravity in loosely spaced or cloud formation, a burner for producing an ascending column of hot gases within the shaft, the depth of said shaft being such that the upper portion serves for the preheating of the raw material and the portion directly above said burner serves for the clinkering of said material, a chamber for the hot clinker disposed below the point of admission of the hot gases, and a conduit extending upwardly through said chamber for delivering combustion supporting air to said burner, whereby said air is heated by the clinker.

2. A kiln for the calcining of materials in powdered form comprising a vertically elongated shaft extending below the ground level and completely encircled by the ground, whereby heat radiation is retarded, said shaft comprising an upper portion and a lower portion, the latter having a base, the said lower portion being reduced in cross-sectional area, means in the upper portion of the shaft for introducing powdered raw materials thereinto which then descends by gravity in loosely spaced or cloud formation, a burner located in the said base for burning combustible materials, the upper portion of the shaft having an outlet for the escape of gases therefrom, a cooling chamber for the hot sintered material connected with and disposed below the base of the shaft to permit continuous flow of calcined material thereto from the said shaft, and pipe means connecting the lower portion of the shaft with a source of air supply for supporting combustion in the shaft, said pipe means passing through said chamber for permitting heat exchange between the clinker therein and the air, and means for removing the cooled material from said chamber.

3. A kiln for the preheating and clinkering of raw materials in powdered form, comprising a shaft extending below the ground level and completely encircled by the ground, said shaft having an upper portion serving as a preheating chamber and a lower portion serving as a clinkering chamber, means for introducing powdered raw material at the upper end of the shaft for descent therein by gravity in loosely spaced or cloud formation, and means for producing a descending column of hot gases within the lower end of the clinkering chamber, the height of the preheating chamber being such that powdered material introduced in the upper end thereof is thoroughly intermixed and calcined by the hot gases during the descent through the clinkering chamber.

4. A kiln for the preheating and clinkering of raw materials in powdered form comprising a shaft extending below the ground level and completely encircled by the ground, whereby heat radiation from the shaft is retarded, said shaft including a preheating chamber and a lower clinkering chamber of reduced cross-sectional area and having means for introducing powdered raw material at the upper end of the shaft, whereby it may descend in loosely spaced or cloud formation through said chambers in succession, and means for producing an ascending column of hot gases within the lower portion of the shaft, whereby they ascend as a column within the shaft.

5. A kiln for preheating and clinkering of raw materials in powdered form comprising a shaft extending below the ground level and completely encircled by the ground, whereby heat radiation from the shaft is retarded, said shaft including an upper preheating chamber and a lower clinkering chamber of reduced cross-sectional area, means for introducing powdered raw material at the upper end of the preheating chamber, whereby it may descend by gravity in loosely spaced or cloud formation through both chambers, and a burner at the lower end of the clinkering chamber for producing an ascending column of hot gases within the shaft.

6. A kiln for the preheating and clinkering of raw materials in powdered form comprising a shaft extending below the ground level and completely encircled by the ground and having an upper portion serving as a preheating chamber and a lower portion serving as a clinkering chamber of relatively reduced cross-section, means for introducing powdered raw material into the upper end of the shaft, whereby said material descends by gravity in loosely spaced or cloud formation, a burner at the base of the clinkering chamber, a chamber for the hot clinker below the burner into which the said clinker is discharged, and means for passing to the burner the air to support combustion through the hot clinker in the chamber.

7. A kiln for the preheating and clinkering of raw materials in powdered form comprising a shaft sunk in the ground and completely encircled by the latter, means for introducing finely subdivided material into said shaft, whereby it may drop by gravity in loose form, said shaft having an upper preheating portion and a lower clinkering portion, an adit at the lower end of the clinkering portion, a burner at the inner end of said adit for producing hot gases and delivering the same to the clinkering portion, whereby they may flow upwardly through said downwardly falling material to clinker the material in the lower portion of the shaft, a cooling chamber below said burner, means for delivering combustion supporting air through said chamber to said burner, and means for withdrawing the cooled clinker from the lower end of the chamber.

In testimony whereof I have signed my name to this specification.

EDOUARD PERCY CRANWILL GIROUARD.